(12) United States Patent  
Shaw

(10) Patent No.: US 10,937,336 B1  
(45) Date of Patent: Mar. 2, 2021

(54) FULL-SCALE ANATOMICAL REFERENCE GUIDE

(71) Applicant: Michelle Estella Shaw, Trevose, PA (US)

(72) Inventor: Michelle Estella Shaw, Trevose, PA (US)

(*) Notice: Subject to any disclaimer, the term of this patent is extended or adjusted under 35 U.S.C. 154(b) by 266 days.

(21) Appl. No.: 15/907,787

(22) Filed: Feb. 28, 2018

Related U.S. Application Data

(60) Provisional application No. 62/465,217, filed on Mar. 1, 2017.

(51) Int. Cl.  
*G09B 23/30* (2006.01)

(52) U.S. Cl.  
CPC .................................. *G09B 23/30* (2013.01)

(58) Field of Classification Search  
CPC ..................................................... G09B 23/30  
USPC ........................................................ 434/272  
See application file for complete search history.

*Primary Examiner* — Kesha Frisby  
(74) *Attorney, Agent, or Firm* — Keeley DeAngelo LLP; W Scott Keeley

(57) ABSTRACT

A set of full-scale anatomical reference guides that may be draped over a body for purposes of mapping the underlying anatomical structures and viscera, and for providing a panel to be worn comfortably by a patient during manipulation therapy.

20 Claims, 10 Drawing Sheets

200

300

340

342

344

300

500

FULL-SCALE ANATOMICAL REFERENCE GUIDE

TECHNICAL FIELD

The present disclosure relates to training aids of anatomical models used in the demonstration and teaching of anatomical structures.

BACKGROUND

Illustrative teaching and training tools are used by healthcare practitioners to understand mammalian anatomy. They may be static maps, diagrams, templates, or visual software. A subset of these teaching aids illustrate muscle groups and skeletal structure. In the study of therapeutic massage, anatomical maps indicate locations and interactivity of human muscle groups, skeletal structure, pressure points, and viscera.

Manipulation therapy includes massage therapy, chiropractic therapy, and other types of physical therapy in which a practitioner manipulates a patient's body for purposes of pain relief, and facilitation of blood, and lymph circulation.

Anatomy is the branch of science concerned with the bodily structure of humans, animals and other living organisms, especially as revealed by dissection and the separation of parts.

The skeletal system of an animal refers to its structure of bones.

The nervous system is the part of an animal that coordinates its actions by transmitting signals to and from different parts of its body.

The circulatory system is an organ system of an animal that permits blood to circulate and transport nutrients, oxygen, carbon dioxide, hormones, and blood cells to and from the cells in the body to provide nourishment and help in fighting diseases, stabilize temperature and pH, and maintain homeostasis.

A visceral system comprises the internal organs in the main cavities of the body, especially those in the abdomen.

Skeletal muscles are attached to bones on each end by tendons. At one end of the tendon, the "origin" is the fixed attachment of muscle to bone. At the other end of attachment, the "insertion" point moves as the muscle contracts. "Origins and insertions" refers to this aspect of the muscular system of a mammal.

A lymphatic system, part of the circulatory system, is a network of lymphatic vessels that carry a clear fluid called lymph directionally towards the heart.

A muscular system is an organ system of skeletal, smooth and cardiac muscles. It permits movement of the body, maintains posture, and circulates blood throughout the body.

"Posterior" refers to the rear of the body of an animal.

"Anterior" refers to the front of the body of an animal.

"Sen Lines" is a term used in Thai bodywork to describe pathways or routes through which body energies are said to travel.

Trigger points are hyper-irritable spots in the fascia surrounding skeletal muscle. They are associated with palpable nodules in taut bands of muscle fibers.

A peripheral nerve block is accomplished by injecting a local anesthetic near the nerve or nerves that control sensation and movement to a specific part of the body.

Meridian lines are invisible lines that carry energy throughout the body.

Felt is a type of cloth made of rolled or pressed wool or other suitable textile, matted to create a smooth surface.

Other terms mentioned here are familiar to one skilled in the art.

SUMMARY

The present embodiment relates to full-scale illustrative teaching aids in the form of textile panels that may be draped over a body for purposes of mapping the underlying anatomical structures and viscera, and for providing a textile panel to be worn comfortably during manipulation therapy.

Two example iterations of the embodiment include one with multiple textile panels representing numerous anatomical systems of a human body, any of which may be laid upon a patient during manipulation therapy; and one with movable flaps that can be positioned atop other layers, with representative flaps opened at certain sections to reveal underlying structures.

The panels, which are preferably rectangular in shape, are releasably affixed to each other via any of a plurality of fasteners (such as the felt-and-flannel type). Posterior and anterior anatomical systems may be illustrated, and can be placed on the client's body according to the area being treated. In use, the practitioner chooses the appropriate panel corresponding to the bodily system to be addressed during that portion of massage therapy. The panel is draped over the section of the client's body, overlaying the actual underlying anatomical system.

One skilled in the art understands that any mammal may be illustrated as the subject of this embodiment, and that body systems and identifications other than those mentioned here may also be illustrated. Examples include areas of human anatomy where the therapist identifies needle insertion points to administer peripheral nerve blocks; and text labels that refer to specific meridian lines, Sen Lines and trigger points of the anatomy.

One skilled in the art understands that a panel could be made of textile material. The "panel" may also be referred to here as a "sheet." One skilled in the art understands that the embodiment may also include posterior representations of the anatomical systems described here.

Other objects and features will become apparent from the following detailed description considered together with the accompanying drawings. These drawings are designed to illustrate, not limit, the invention.

BRIEF DESCRIPTION OF THE DRAWINGS

To assist those of skill in the art of making and using the disclosed anatomical reference guide, reference is made to the accompanying figures, wherein.

DESCRIPTION

Referring to FIGS. 1-10, there are shown multiple views of an anatomical reference guide according to the present invention.

Figure 1:
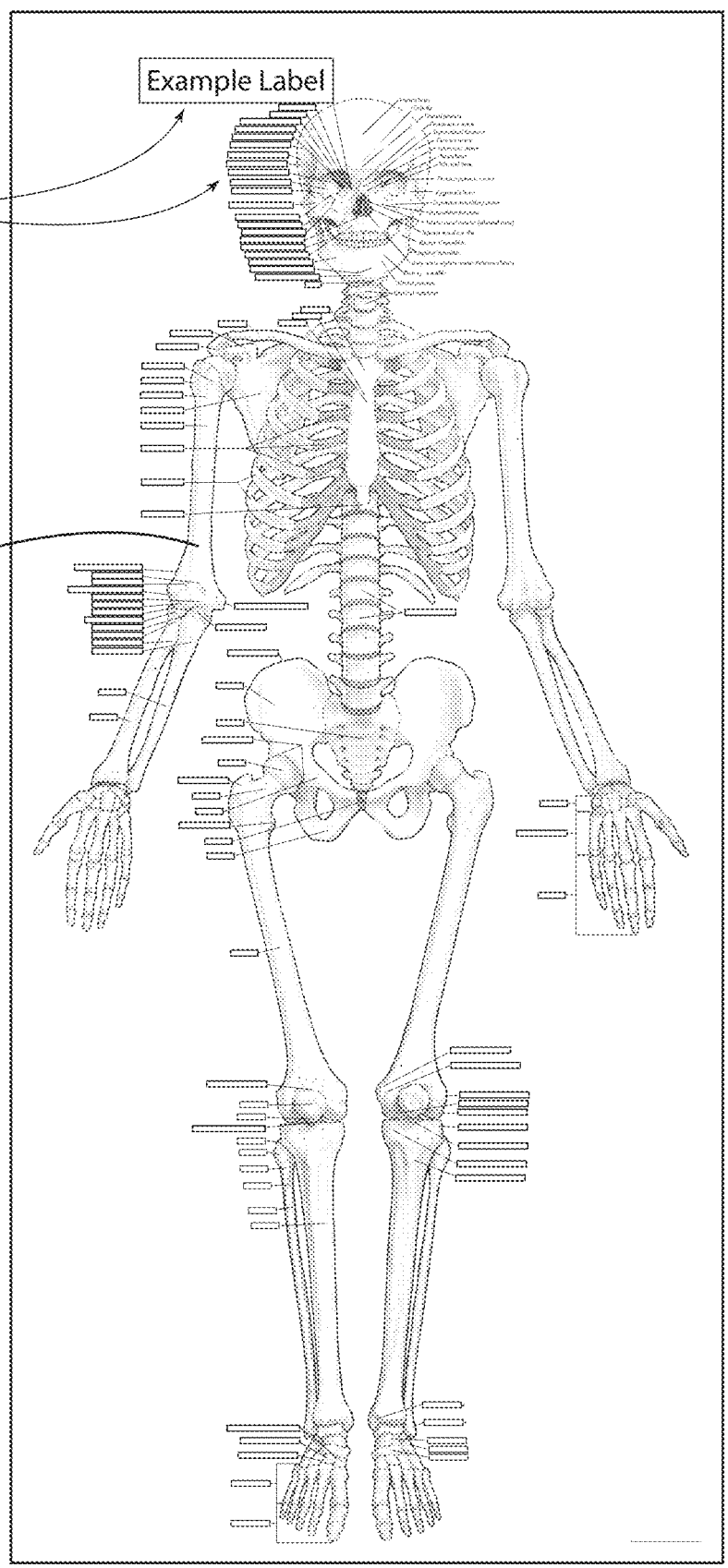
FIG. 1 is an orthographic front view of the embodiment showing a human-anterior anatomy guide of the skeletal system.

In FIG. 1 an example embodiment 100 shows one 110 of a set of panels illustrating the skeletal system. 112 represents an element of the skeletal structure. 114 shows an example of a labeling system used in the embodiment.

Figure 2:
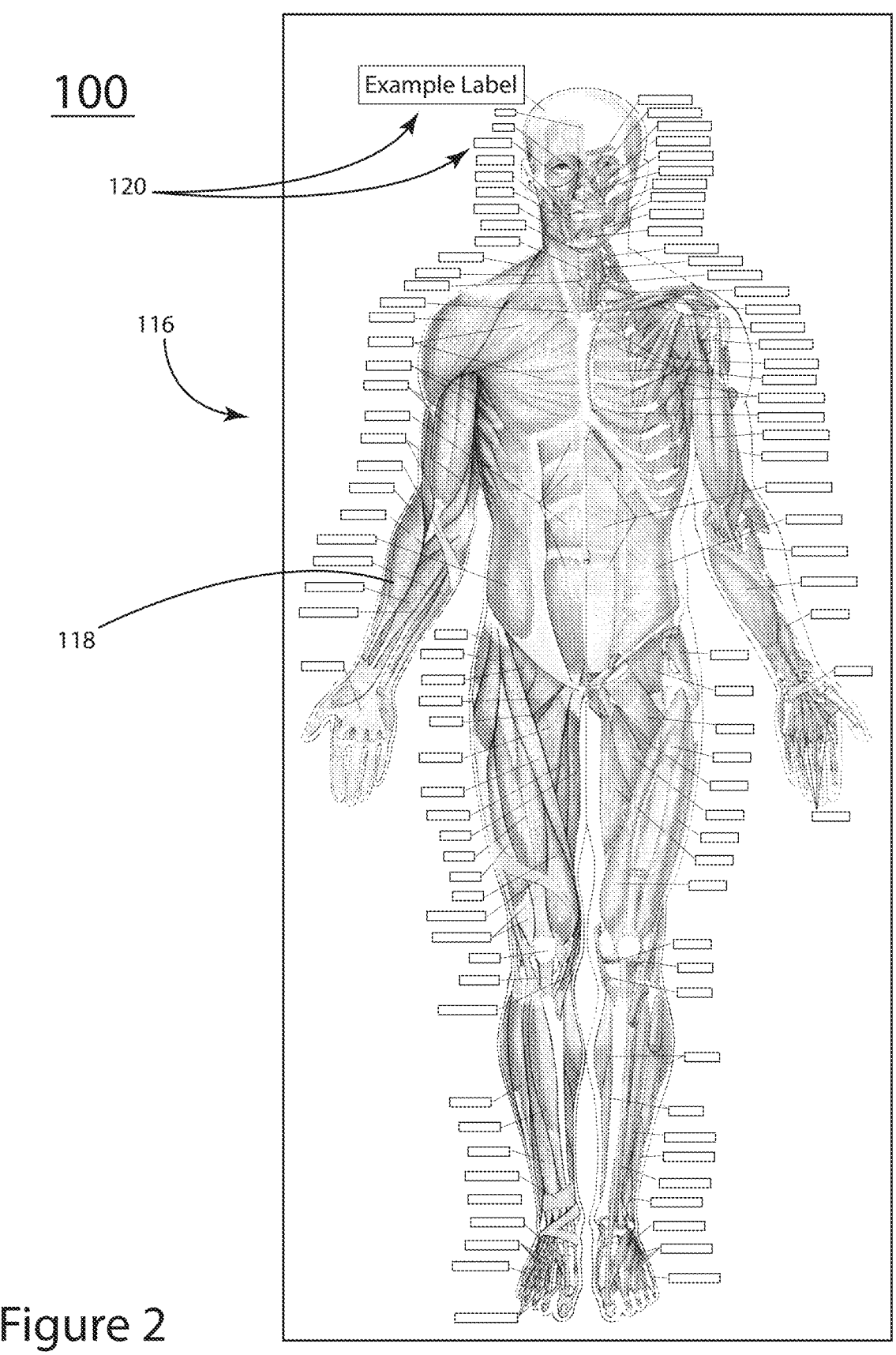
FIG. 2 is an orthographic front view of the embodiment showing a human-anterior anatomy guide of the muscular system.

FIG. 2, 100 shows one 116 of a set of panels illustrating the muscular system. 118 represents an element of the muscular structure. 120 shows an example of a labeling system used in the embodiment.

Figure 3:
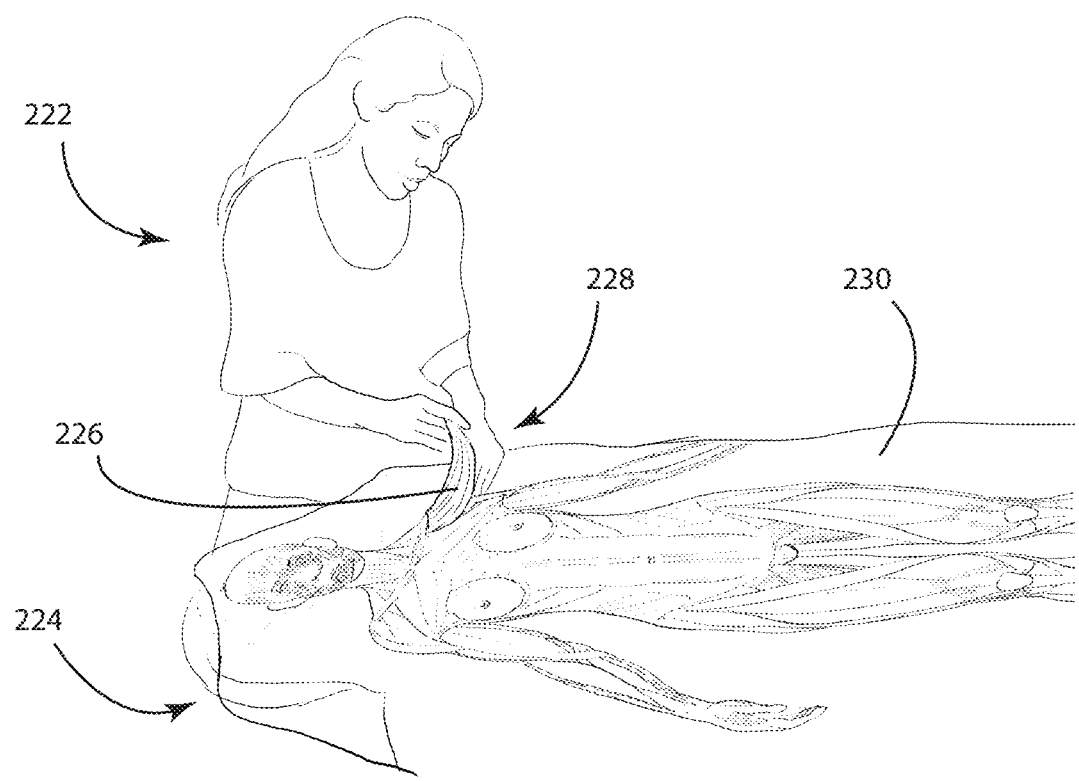
FIG. 3 is a front, perspective view of the anatomy guide in suggested use.

FIG. 3 is a perspective view of the anatomy guide in suggested use 200. A therapist 222 manipulates 228 a patient 224 while referring to a part of the patient's anatomy by moving aside a flap representing a part 226 of the human anatomy. The flap represents one part of an anatomical system panel 230.

Figure 4:
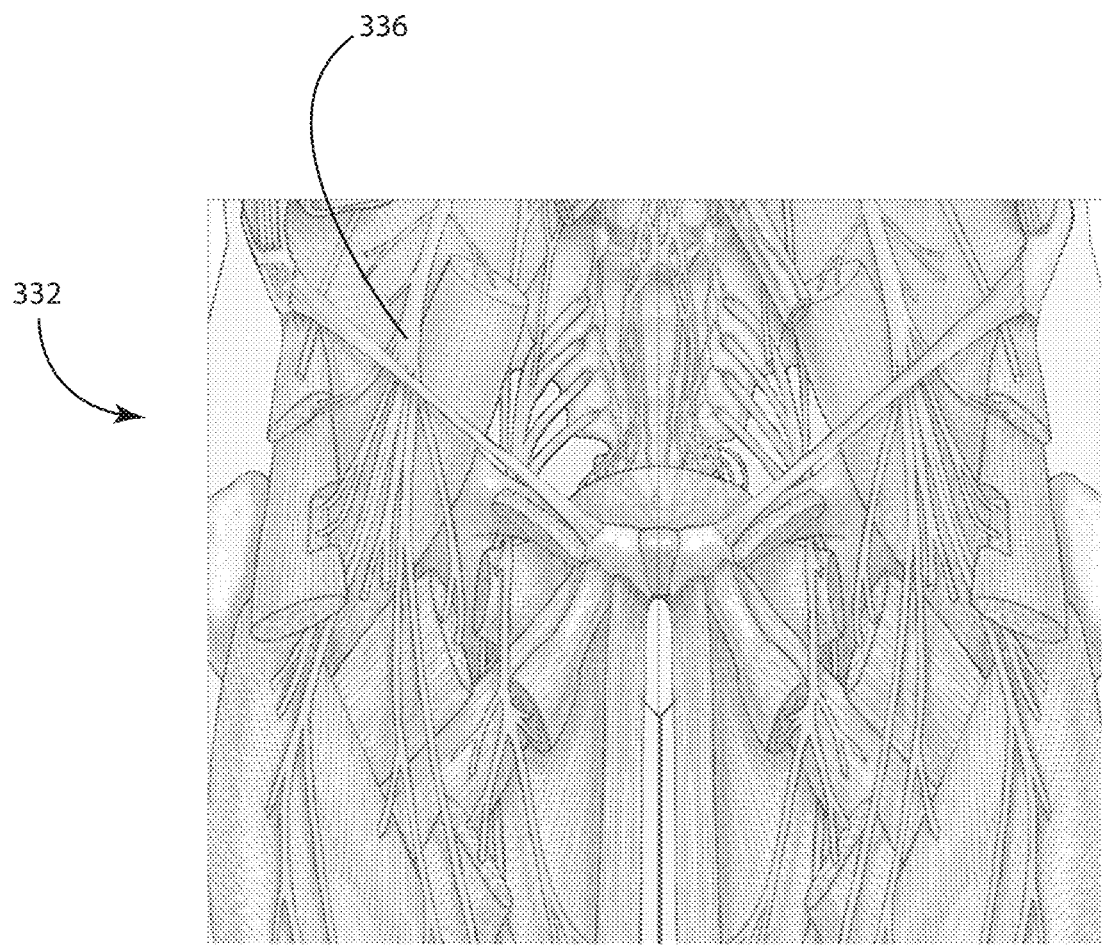
FIG. 4 is an orthographic view of the anatomical reference guide showing an anterior, representative segment of the nervous system.
Figure 5:
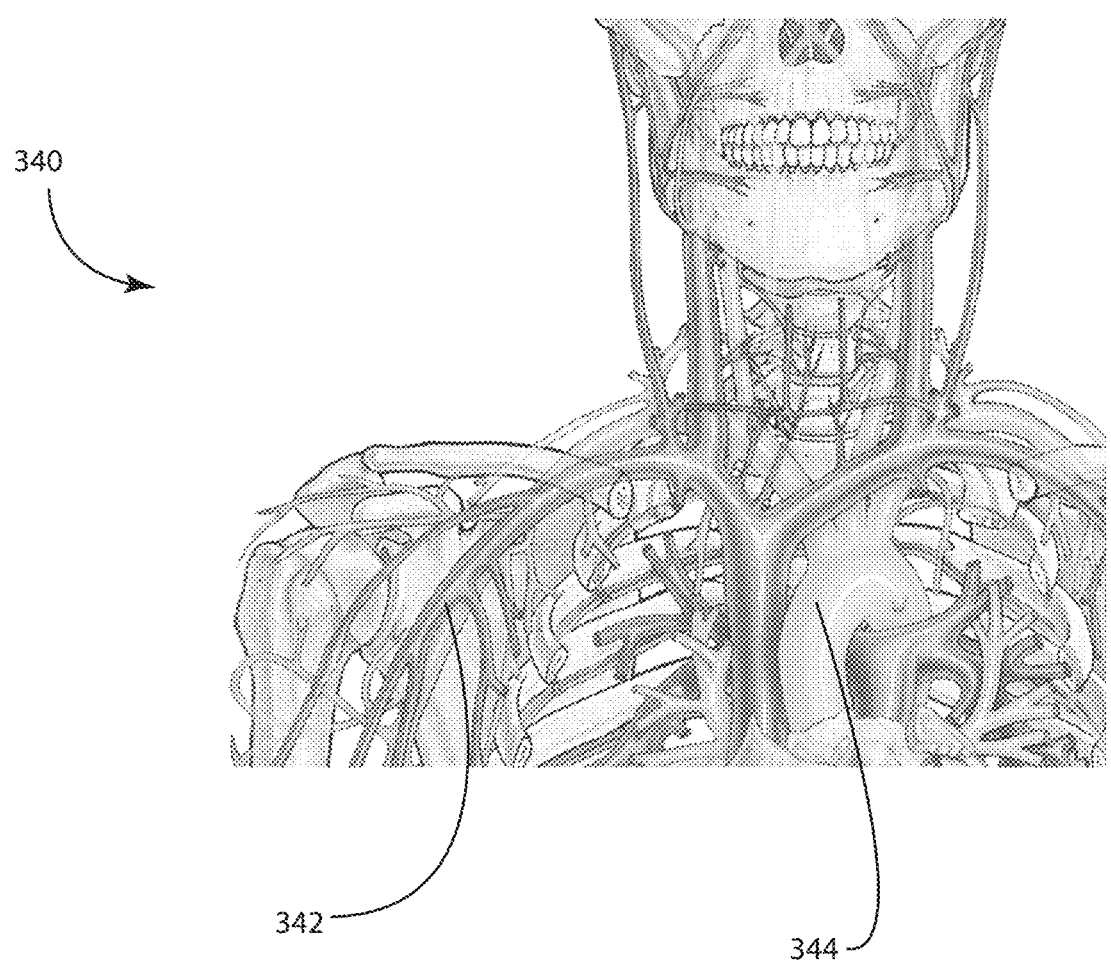
FIG. 5 is an orthographic view of the anatomical reference guide showing anterior, representative segment of the circulatory system.

FIG. 4, 300 shows a representative segment 332 of the anterior nervous system of the anatomical reference guide. It illustrates a femoral nerve 336, FIG. 5, 300 shows a representative segment 340 of the circulatory system of a human body including the axillary vein 342 and the aorta artery 344.

Figure 6:
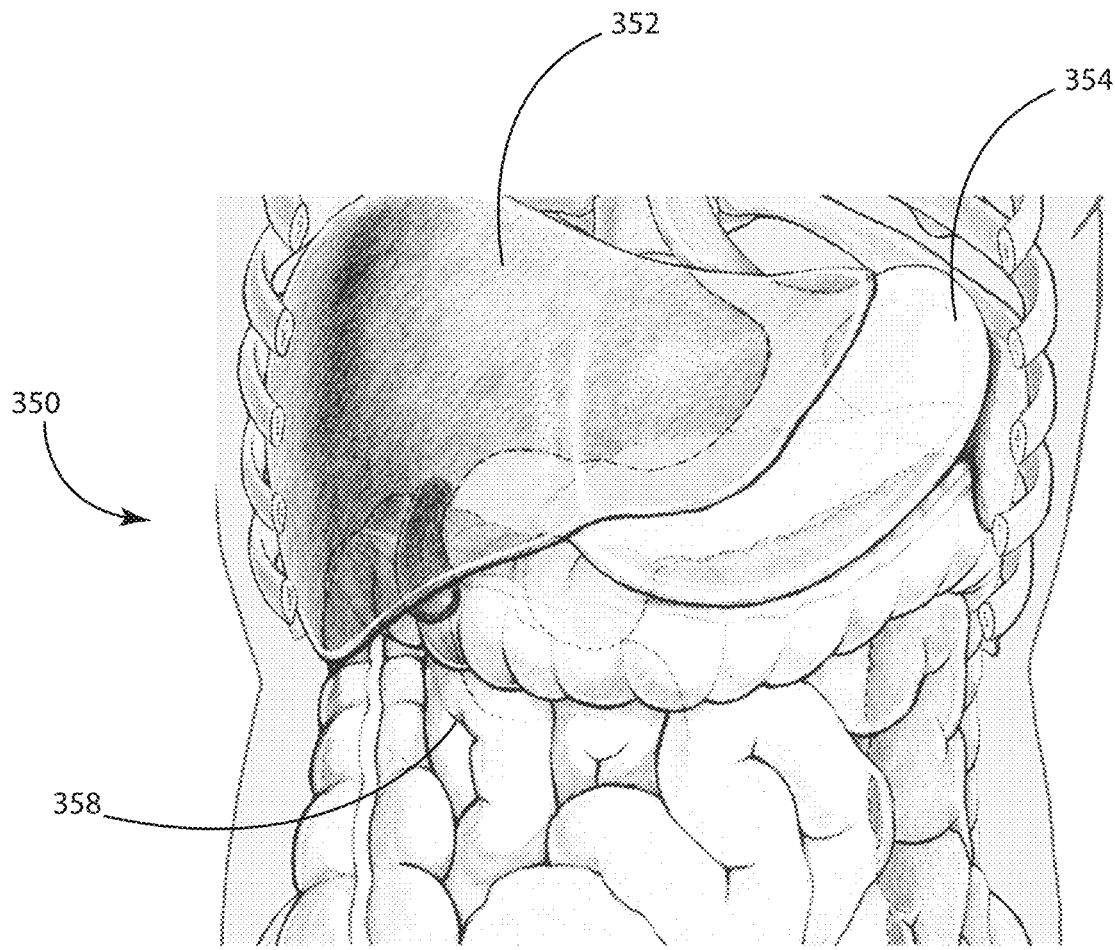
FIG. 6 is an orthographic view of the anatomical reference guide showing anterior, representative segment of the visceral system.

FIG. 6, 300 shows a representative segment 350 of the visceral system of a human body including the liver 352, stomach 354 and the intestines 358.

Figure 7:
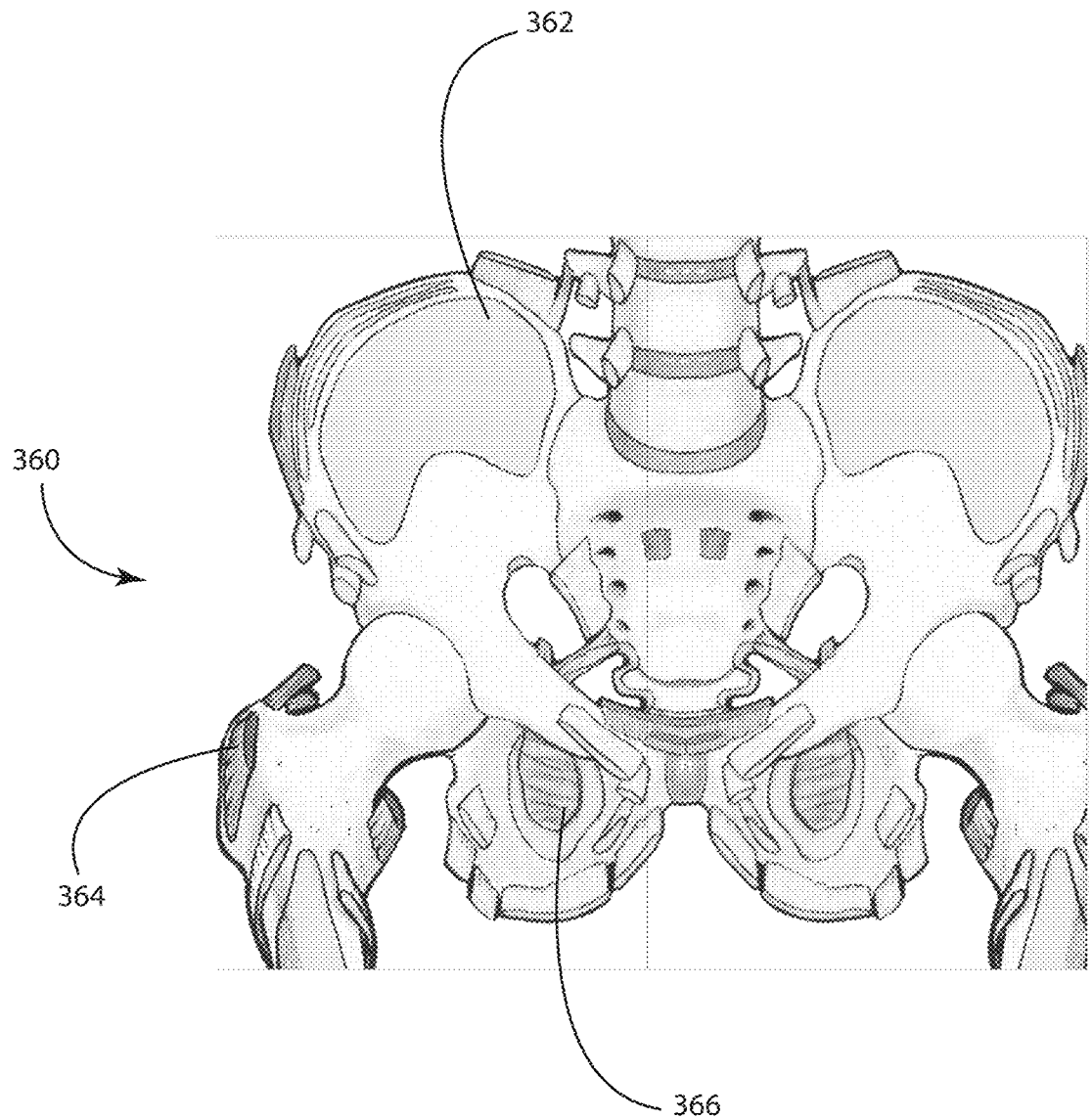
FIG. 7 is an orthographic view of the anatomical reference guide showing anterior, representative segment of the origins and insertions of muscles.

FIG. 7,300 shows a representative segment 360 of the origins and insertions of muscles in a human body the Iliacus muscle 362, the Gluteus minimus muscle 364 and the Obturator externus muscle 366.

Figure 8:
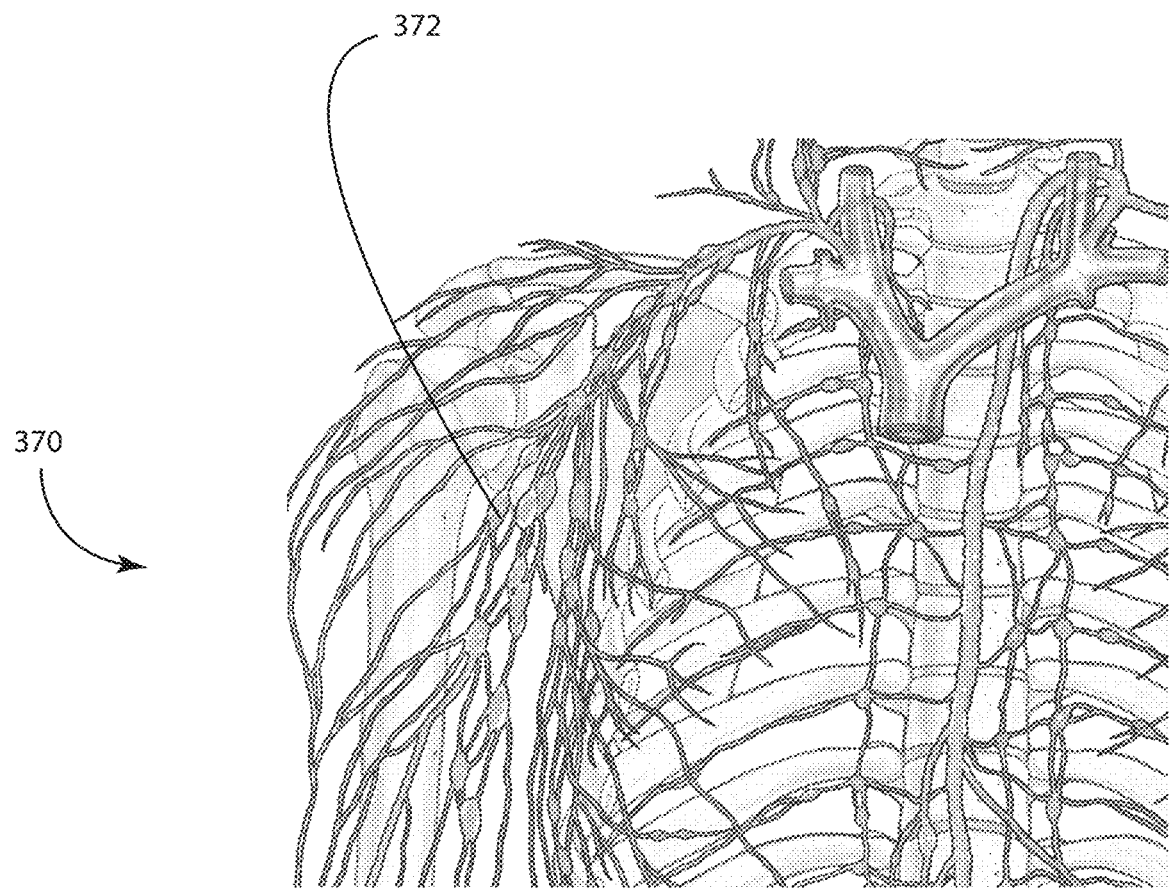
FIG. 8 is an orthographic view of the anatomical reference guide showing anterior, representative segment of the lymphatic system.

FIG. 8, 300 shows a representative segment 370 of the lymphatic system in a human body including a lymph node 372.

Figure 9:
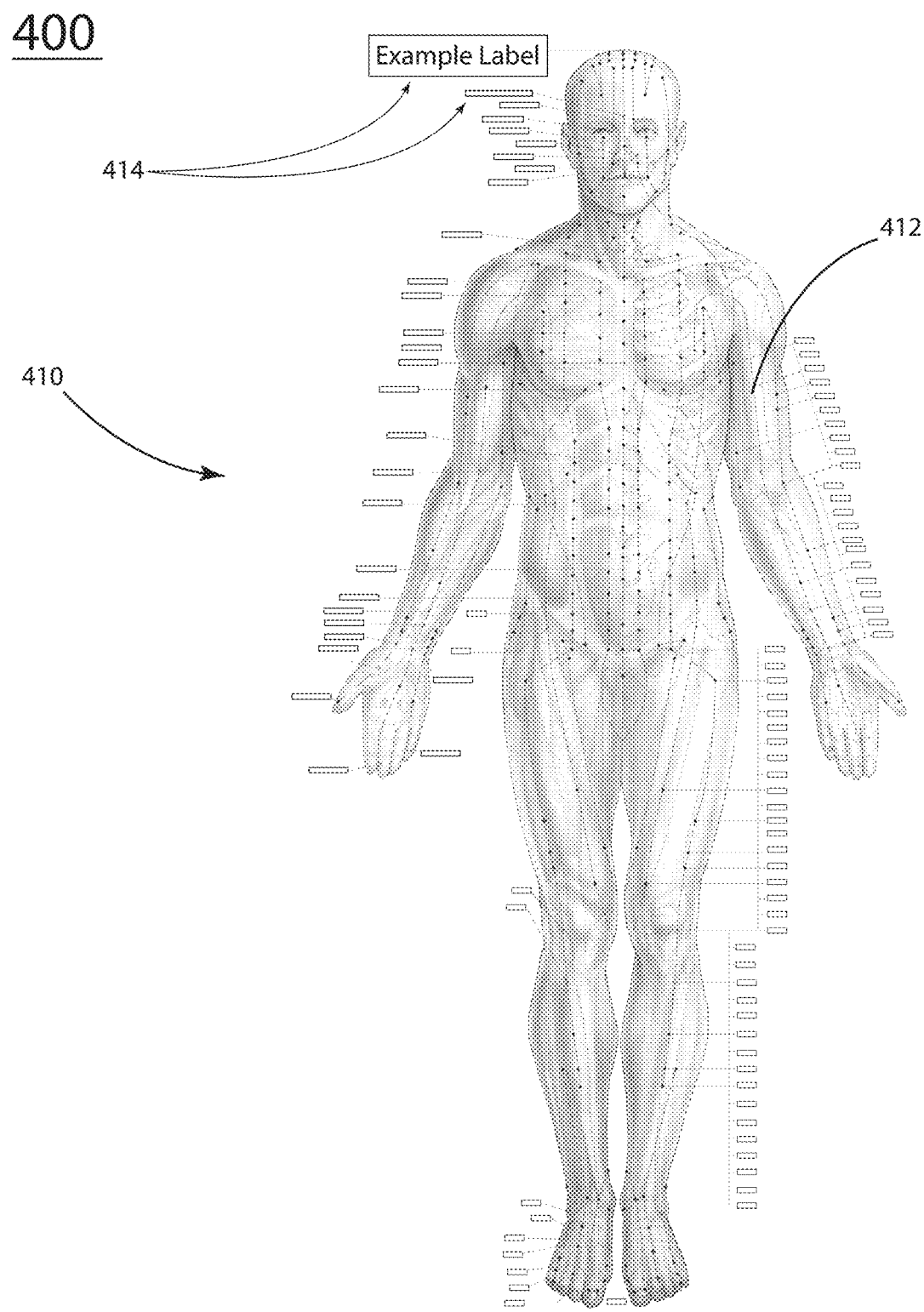
FIG. 9 is an orthographic view of the anatomical reference guide showing acupressure points.

FIG. 9, 400 shows one 410 of a set of panels illustrating acupressure location points. 412 represents elements of the acupressure location points. 414 shows an example of a labeling system used in the embodiment.

Figure 10:
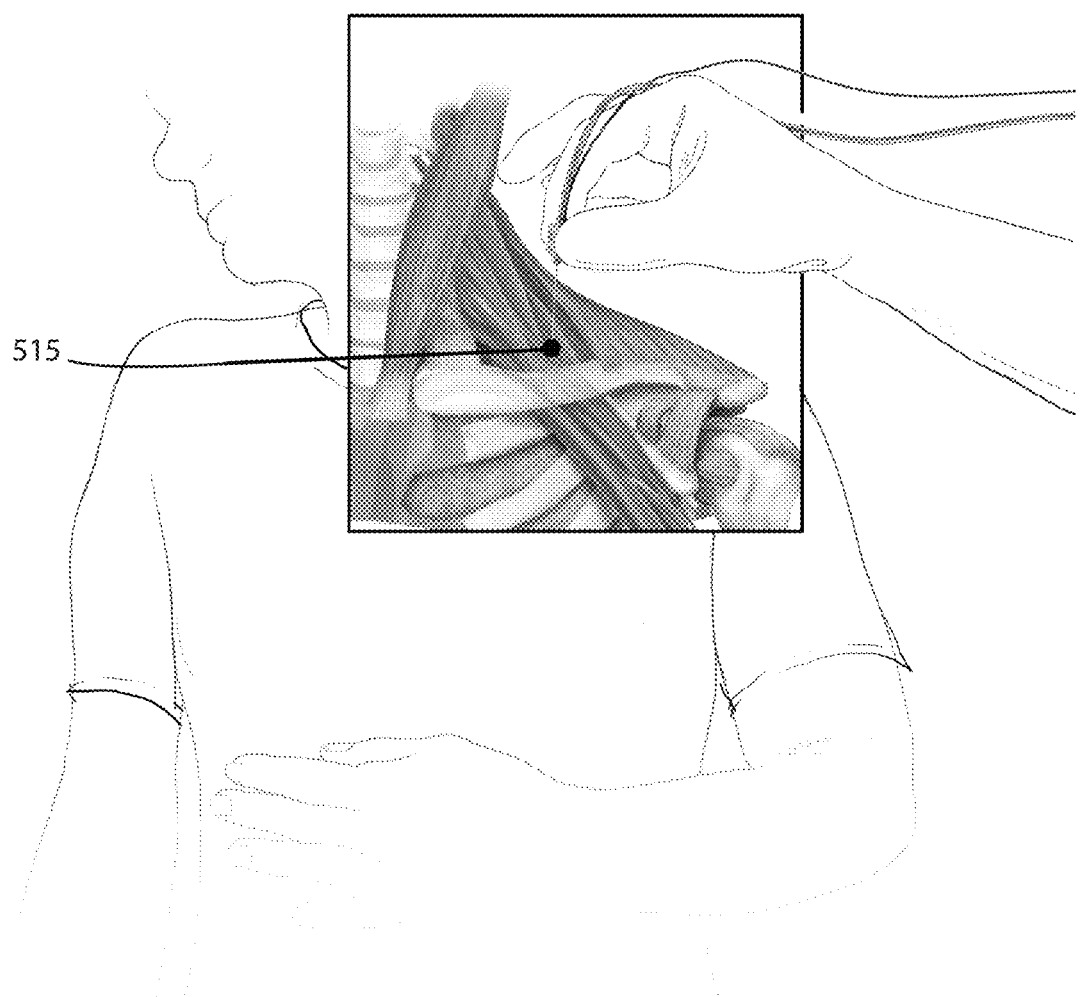
FIG. 10 is a detailed view of an example embodiment in use. It shows a layer of the embodiment with an opening as it is moved aside to reveal muscular structure during acupuncture treatment.

FIG. 10, 500 shows a detailed view of an example embodiment in use. A layer of the embodiment with an opening flap is moved aside to reveal the infraclavicular plexus 515 as illustrated in another panel of the embodiment. The action shown is an infraclavicular block.

The example embodiments described here should not be construed as limiting. Additions and modifications to what is expressly described here are included within the scope of the invention. The features of the various embodiments described here are not mutually exclusive and can exist in various combinations and permutations, even if such combinations or permutations are not made express here, without departing from the spirit and scope of the invention.

The invention claimed is:

1. A set of textile panels for covering a patient receiving manipulation therapy comprising:
   a full-scale graphical representation of a representative patient's anatomy, printed on at least one side of each textile panel of said set of textile panels;
   wherein each textile panel of said set of textile panels is positioned atop a patient and referred to by a therapist performing manipulation therapy on specific sections of the patient's body according to the full-scale graphical representation.

2. The set of textile panels of claim 1 further comprising, wherein the full scale graphical representation includes text labels that refer to specific parts of the anatomy in said graphical representation.

3. The set of textile panels of claim 1 further comprising, wherein the full scale graphical representation on at least one textile panel is of a skeletal system representing said patient's anatomy.

4. The set of textile panels of claim 1 further comprising, wherein the full scale graphical representation on at least one textile panel is of a nervous system representing said patient's anatomy.

5. The set of textile panels of claim 1 further comprising wherein the full scale graphical representation on at least one textile panel is of a circulatory system representing said patient's anatomy.

6. The set of textile panels of claim 1 further comprising wherein the full scale graphical representation on at least one textile panel is of a visceral system representing said patient's anatomy.

7. The set of textile panels of claim 1 further comprising, wherein the full scale graphical representation on at least one textile panel of the set of textile panels is of origins and insertions of musculature of the patient's anatomy.

8. The set of textile panel of claim 1 further comprising, wherein the full scale graphical representation on at least one textile panel of the set of textile panels is of a human skeletal system.

9. The set of textile panels of claim 1 further comprising wherein the full scale graphical representation on at least one textile panel of the set of textile panels is of a human nervous system.

10. The set of textile panels of claim 1 further comprising wherein the full scale graphical representation on at least one textile panel of the set of textile panels is of a human circulatory system.

11. The set of textile panels of claim 1 further comprising, wherein the graphical representation on at least one textile panel of the set of textile panels is of a human visceral system.

12. The set of textile panels of claim 1 further comprising, wherein the full scale graphical representation on at least one textile panel of the set of textile panels is of a human lymphatic system.

13. A set of textile panels for covering a patient during manipulation therapy comprising:
   at least a first textile panel; and
   at least a second textile panel; and
   at-least a first full scale graphical representation; and
   at-least a second full scale graphical representation; and
   said at-least first full scale graphical representation of one aspect of the patient's anatomy printed on at least one side of the first textile panel; and
   said at-least second full scale graphical representation of another aspect of the anatomy of the patient, printed on at least one side of the second textile panel;

wherein
the set of full-scale graphical representations positioned over the patient is used by a therapist to locate and understand the anatomy of the patient as illustrated in said, at-least first and at-least second full scale graphical representation.

14. The set of textile panels of claim 13 further comprising, wherein the at-least first full-scale graphical representation and the at-least second full-scale graphical representation is of human anatomy.

15. The set of textile panels of claim 13 further comprising, wherein;
said at-least first graphical representation of a patient's posterior anatomy is printed on the first of said, at-least one side of said, at-least first textile panel; and
said at-least second full scale graphical representation of a patient's anterior anatomy is printed on the second of said, at-least one side of the said, at-least first textile panel; and
said at-least first full scale graphical representation of the patient's posterior anatomy is printed on the first of said, at-least one side of the said, at-least second textile panel; and
said at-least second graphical representation of the anterior anatomy is printed on the second of said, at-least one side of the said, at-least second textile panel; wherein
the set of full-scale graphical representations positioned over the patient is used by a therapist to view and understand the patient's posterior and anterior anatomy, as illustrated in said, at-least first and said, at-least second graphical representations.

16. The set of textile panels of claim 13 further comprising:
said at-least first full-scale graphical representation of a human patient's anatomy printed on first of said, at-least one side of said, at-least first textile panel; and
at least one openings in said at-least first textile panel; and
at least one flaps movably engaged over said at least one openings in said at-least first textile panel; wherein
the therapist temporarily opens said at least one flap to view areas of the body that are beneath said at least one flap.

17. The set of textile panels of claim 13 further comprising, wherein at least one additional textile panel having a full-scale graphical representation of a human patient's anatomy printed on at-least one side of said at-least one additional textile panel; wherein
said at least one additional textile panel is placed beneath said at-least first textile panel.

18. A segmented textile panel for a patient for use during manipulation therapy comprising:
a full-scale graphical representation of a patient's anatomy, printed on at least one side of said segmented textile panel; and
segments of said segmented textile panel being movably engaged with adjacent segments, and
said segments are engaged with adjacent segments, forming a full-scale image of said patient's anatomy; wherein
a therapist assembles the segments as a learning aid in the study of the patient's anatomy.

19. The segmented textile panel of claim 18 further comprising, wherein the full-scale graphical representation is of a human patient's anatomy.

20. The segmented textile panel of claim 18 further comprising, wherein at least one of said segments is made of flannel and at least two other of said segments are made of felt.

\* \* \* \* \*